United States Patent
Yawata et al.

(10) Patent No.: US 8,619,409 B2
(45) Date of Patent: Dec. 31, 2013

(54) ELECTROCHEMICAL DEVICE

(75) Inventors: Kazushi Yawata, Tsukuba (JP); Naoto Hagiwara, Takasaki (JP); Katsuei Ishida, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 75 days.

(21) Appl. No.: 13/122,139

(22) PCT Filed: Sep. 30, 2009

(86) PCT No.: PCT/JP2009/067451
§ 371 (c)(1),
(2), (4) Date: Mar. 31, 2011

(87) PCT Pub. No.: WO2010/038906
PCT Pub. Date: Apr. 8, 2010

(65) Prior Publication Data
US 2011/0176254 A1 Jul. 21, 2011

(30) Foreign Application Priority Data
Oct. 1, 2008 (JP) ............................... 2008-256587

(51) Int. Cl.
| H01G 4/228 | (2006.01) |
| H01G 9/00 | (2006.01) |
| H01G 5/01 | (2006.01) |
| H01G 5/38 | (2006.01) |
| H01G 5/06 | (2006.01) |
| H01M 8/04 | (2006.01) |
| H01M 10/50 | (2006.01) |

(52) U.S. Cl.
USPC ........ 361/520; 361/278; 361/299.2; 361/540; 361/298.4; 361/502; 429/434; 429/120

(58) Field of Classification Search
USPC ........... 361/502, 278, 299.2, 540, 298.4, 520; 429/120, 434
See application file for complete search history.

(56) References Cited

U.S. PATENT DOCUMENTS 6,743,546 B1 6/2004 Kaneda et al.
7,667,975 B2 2/2010 Kambara et al.
(Continued)

FOREIGN PATENT DOCUMENTS

CN 1316114 A 10/2001
CN 1830114 A 9/2006
(Continued)

OTHER PUBLICATIONS

Notification of Second Office Action issued by Chinese Patent Office, mailed Jul. 17, 2012, for Chinese counterpart application No. 200980138262.1.

(Continued)

Primary Examiner — Eric Thomas
Assistant Examiner — Arun Ramaswamy
(74) Attorney, Agent, or Firm — Law Office of Katsuhiro Arai (57) ABSTRACT

An electrochemical device, e.g., an electric double layer capacitor, is applicable to high-temperature reflow soldering wherein a lead-free solder is used, and is provided with an electric storage element, a package having the electric storage element sealed therein, and a positive electrode terminal and a negative electrode terminal, each of which is led out from the electric storage element and is provided with a part sealed in the package with the electric storage element and other part led out to the outside the package. On a part of the positive electrode terminal and on a part of the negative electrode terminal, increased thermal resistance sections for suppressing heat transfer to the electric storage element via the terminals from other parts of the positive electrode terminal and other parts of the negative electrode terminal are arranged, respectively.

6 Claims, 7 Drawing Sheets

(A)

(B)

(56) References Cited

U.S. PATENT DOCUMENTS

| | | |
|---|---|---|
| 2004/0146786 A1* | 7/2004 | Sato et al. .................. 429/326 |
| 2006/0188777 A1* | 8/2006 | Kaneta ........................ 429/128 |
| 2007/0292753 A1 | 12/2007 | Zama et al. |

FOREIGN PATENT DOCUMENTS

| | | | |
|---|---|---|---|
| CN | 1883237 A | 12/2006 | |
| JP | 2001345090 A * | 12/2001 | ............. H01M 2/26 |
| JP | 2002-015954 A | 1/2002 | |
| JP | 2002-056839 A | 2/2002 | |
| JP | 2006-164752 A | 6/2006 | |
| JP | 2006-202767 A1 | 8/2006 | |
| JP | 2007-335290 A | 12/2007 | |
| WO | 00/59063 A | 10/2000 | |
| WO | 2005/013408 A | 2/2005 | |
| WO | 2008091118 A1 | 7/2008 | |

OTHER PUBLICATIONS

Notification of First Office Action issued by Chinese Patent Office, mailed Feb. 20, 2012, for Chinese counterpart application No. 200980138262.1.

Notification of Reasons for Refusal issued by the Japanese Patent Office, mailed Feb. 4, 2013, for Japanese counterpart application No. 2010-531943.

Notification of Reasons for Refusal issued by Japanese Patent Office, mailed Sep. 12, 2012, for Japanese counterpart application No. 2010-531943.

\* cited by examiner

ELECTROCHEMICAL DEVICE

This application is the U.S. National Phase under 35 U.S.C. §371 of International Application PCT/JP2009/067451, filed Sep. 30, 2009, which claims priority to Japanese Patent Application No. 2008-256587, filed Oct. 1, 2008. The International Application was published under PCT Article 21(2) in a language other than English.

TECHNICAL FIELD

The present invention relates to an electrochemical device structured in such a way that a package in which an electric storage is sealed has at least one pair of terminals leading out therefrom.

PRIOR ART

Some electrochemical devices, such as electric double layer capacitors, lithium ion capacitors, redox capacitors and lithium ion batteries, are structured in such a way that an electric storage element and parts of at least one pair of terminals leading out from the electric storage element are sealed in a package and other parts of the terminals are led out to the outside of the package.

To explain the above using a specific example, a conventional electric double layer capacitor having the aforementioned structure is structured in such a way that an electric storage element constituted by a positive electrode and negative electrode that are layered on top of each other via a separator in between, a part of the positive electrode terminal leading out from the positive electrode of the electric storage element, a part of the negative electrode terminal leading out from the negative electrode of the electric storage element, and an electrolyte are sealed in a package, and other parts of the positive electrode terminal and negative electrode terminal are led out to the outside of the package.

The aforementioned package uses, for example, a laminate film having a plastic protective layer, metal barrier layer and plastic heat seal layer arranged in sequence. This package is formed by, for example, folding/bending one rectangular film of a specified size and then heat-sealing the three sides of this folded/bent film (where the heat seal layers are overlapping with each other) to seal the inside.

Electrochemical devices are becoming increasingly smaller in recent years, and there is a desire to allow these electrochemical devices to be mounted on substrates, etc., by high-temperature reflow soldering using lead-free solder, as is done with general electronic components. In other words, there is a growing need for electrochemical devices that support high-temperature reflow soldering using lead-free solder.

However, conventional electrochemical devices having the aforementioned structure do not support high-temperature reflow soldering using lead-free solder, which makes it impracticable to meet the desire to allow these electrochemical devices to be mounted on substrates, etc., by high-temperature reflow soldering using lead-free solder, as is done with general electronic components.

To be more specific, maximum temperatures inside reflow ovens used in reflow soldering using lead-free solder may reach around 250° C., for example. This means that, in the process where a conventional electrochemical device having the aforementioned structure passes through the reflow oven, other parts (locations to be soldered) of the terminals led out to the outside of the package receive a significant amount of heat corresponding to the temperature in the reflow oven, and this heat is transferred through the terminals to the electric storage element in the package. As a result, the electric storage element may undergo thermal deterioration and electrical characteristics of the electrochemical device itself may deteriorate.

Patent Literature 1 Japanese Patent Laid-open No. 2002-15954

SUMMARY OF THE INVENTION

Problems to Be Solved by the Invention

The object of the present invention is to provide an electrochemical device that supports high-temperature reflow soldering using lead-free solder.

Means for Solving the Problems

To achieve the aforementioned object, the present invention provides an electrochemical device that can be mounted by soldering, which comprises: an electric storage element; a package having the electric storage element sealed therein; and at least one pair of terminals where parts of the terminals are led out from the electric storage element and sealed in the package together with the electric storage element, and other parts are led out to the outside of the package; and increased thermal resistance sections are provided on the parts of the terminals for inhibiting heat from transferring to the electric storage element, through the terminals, from the other parts of the terminals.

When this electrochemical device is mounted on a substrate, etc., by high-temperature reflow soldering using lead-free solder, the other parts (locations to be soldered) of the terminals receive a significant amount of heat corresponding to the temperature in the reflow oven in the process where the electrochemical device passes through the reflow oven.

However, since the increased thermal resistance sections are provided on the parts of the terminals of the electrochemical device, transmission of the heat received by the other parts of the terminals to the electric storage element in the package can be suppressed by the increased thermal resistance sections.

In other words, even if a significant amount of heat corresponding to the temperature in the reflow oven is received by the other parts of the terminals during reflow soldering, transmission of this heat to the electric storage element in the package can be suppressed to avert thermal deterioration of the electric storage element, while at the same time any deterioration in electrical characteristics of the electrochemical device due to such thermal deterioration can be inhibited.

Effects of the Invention

According to the present invention, an electrochemical device that supports high-temperature reflow soldering using lead-free solder can be provided.

The aforementioned object and other objects of the present invention, as well as the features of its constitution and effects of its operation, are made clear by the following explanations and attached drawings.

MODE FOR CARRYING OUT THE INVENTION

[First Embodiment]

Figure 1:
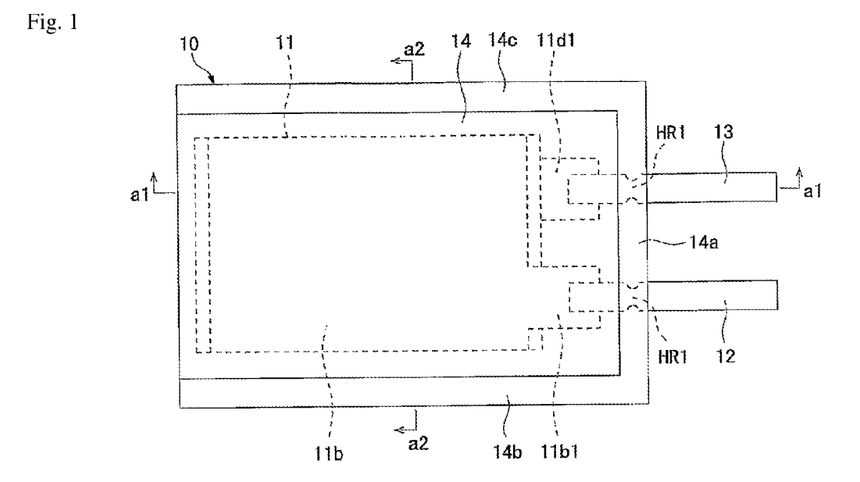
FIG. 1 is a top view of an electric double layer capacitor, illustrating a first embodiment where the present invention is applied to an electric double layer capacitor.
Figure 2:
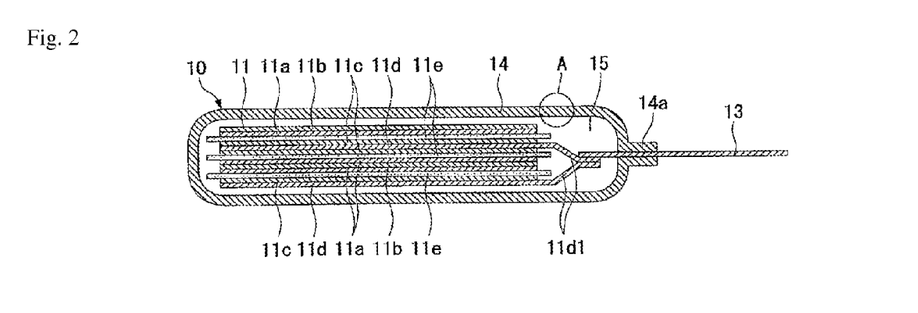
FIG. 2 is a longitudinal section view taken along a line a1-a1 in FIG. 1.
Figure 3:
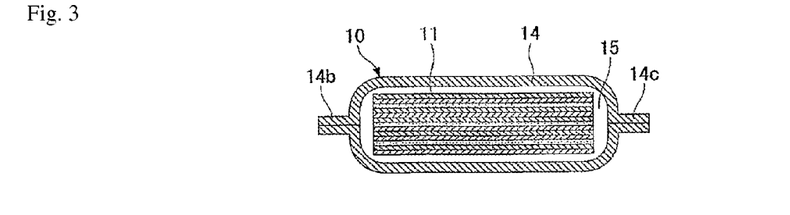
FIG. 3 is a longitudinal section view taken along a line a2-a2 in FIG. 1.
Figure 4:
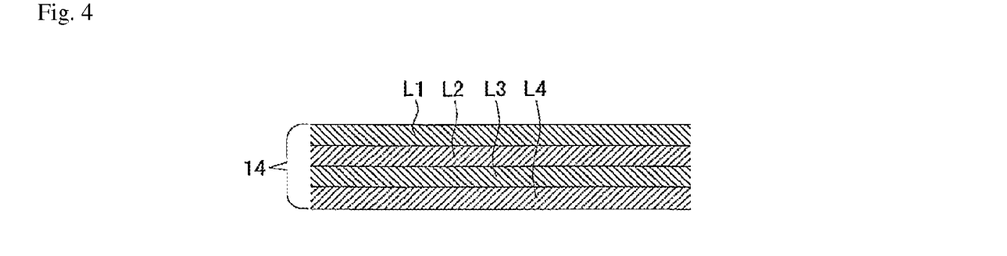
FIG. 4 is a detail view of A in FIG. 2.
Figure 5:
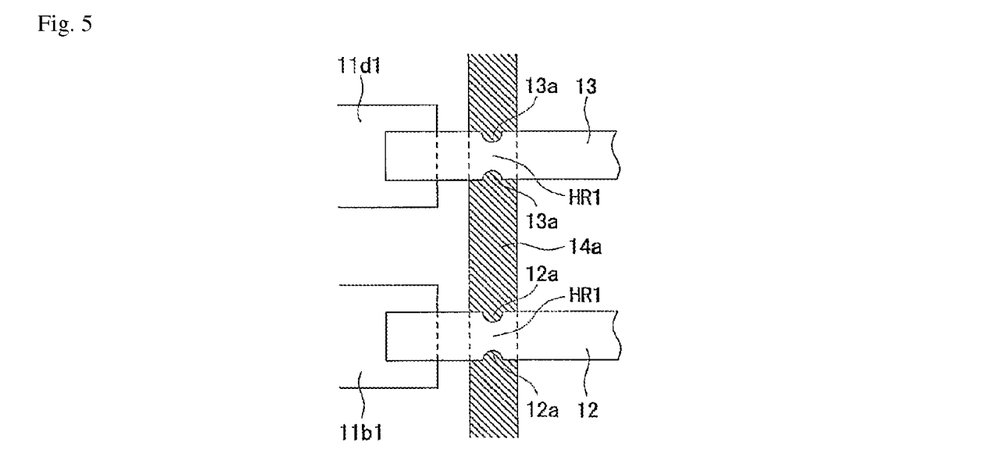
FIG. 5 is an enlarged lateral section view of key parts in FIG. 1.

FIGS. 1 to 5 illustrate a first embodiment where the present invention is applied to an electric double layer capacitor. FIG. 1 is a top view of an electric double layer capacitor, FIG. 2 is a longitudinal section view taken along a line a1-a1 in FIG. 1, FIG. 3 is a longitudinal section view taken along a line a2-a2 in FIG. 1, FIG. 4 is a detail view of A in FIG. 2, and FIG. 5 is an enlarged lateral section view of key parts in FIG. 1.

An electric double layer capacitor 10 in a first embodiment has an electric storage element 11, one pair of terminals (positive electrode terminal 12 and negative electrode terminal 13), package 14, and electrolyte 15.

The electric storage element 11 is constituted by a positive electrode (no reference numeral) and negative electrode (no reference numeral) that are layered one on the other via a separator 11e in between. The positive electrode is constituted by a positive polarizable electrode 11a and positive collector 11b layered with the positive polarizable electrode 11a. On the other hand, the negative electrode is constituted by a negative polarizable electrode 11c and negative collector 11d layered with the negative polarizable electrode 11c. A connection piece 11b1 is provided at the end of each positive collector 11b. Similarly, a connection piece 11d1 is provided at the end of each negative collector 11d.

The electric storage element 11 shown in the drawings is virtually constituted by three units layered on top of one another, where each unit comprises the positive electrode, negative electrode and separator 11e, but the number of units may be four or more, or only one. Also note that, while the electric storage element 11 shown has collectors 11b and 11d placed as the top layer and bottom layer, polarizable electrodes and separators may be added on the outer side of the top layer and bottom layer, respectively, according to the manufacturing process, etc.

The positive electrode terminal 12 and negative electrode terminal 13 are formed as strips made of aluminum or other metal. One end of the positive electrode terminal 12 is electrically connected to each connection piece 11b1 of the electric storage element 11. Similarly, one end of the negative electrode terminal 13 is electrically connected to each connection piece 11d1 of the electric storage element 11. A part of the positive electrode terminal 12, including the end connected to the connection piece, is sealed in the package 14. Similarly, a part of the negative electrode terminal 13, including the end connected to the connection piece, is sealed in the package 14. Also, the other part of the positive electrode terminal 12 is led out to the outside of the package 14 via a first sealed section 14a explained later. Similarly, the other part of the negative electrode terminal 13 is led out to the outside of the package 14 via a first sealed section 14a explained later.

The part of the positive electrode terminal 12 sealed in the package 14 is hereinafter referred to as "the one part of the positive electrode terminal 12," while the part of the negative electrode terminal 13 sealed in the package 14 is hereinafter referred to as "the one part of the negative electrode terminal 13." Also, the part of the positive electrode terminal 12 led out to the outside of the package 14 is referred to as "the other part of the positive electrode terminal 12," while the part of the negative electrode terminal 13 led out to the outside of the package 14 is referred to as "the other part of the negative electrode terminal 13."

In addition, an increased thermal resistance section HR1 is provided on the one part of the positive electrode terminal 12, and also on the one part of the negative electrode terminal 13. These increased thermal resistance sections HR1 play the role of inhibiting heat from being transferred from the other part of the positive electrode terminal 12 and other part of the negative electrode terminal 13 to the electric storage element 11 through the terminals 12, 13. The increased thermal resistance section HR1 of the positive electrode terminal 12 is constituted by a narrow section formed on the one part of the positive electrode terminal 12. This narrow section is formed by providing notches 13a at the edges on both sides of the positive electrode terminal 12. Similarly, the increased thermal resistance section HR1 of the negative electrode terminal 13 is constituted by a narrow section formed on the one part of the negative electrode terminal 13. This narrow section is formed by providing notches 13a at the edges on both sides of the negative electrode terminal 13.

Furthermore, the increased thermal resistance section HR1 of the positive electrode terminal 12 is positioned entirely within the first sealed section 14a. Similarly, the increased thermal resistance section HR1 of the negative electrode terminal 13 is positioned entirely within the first sealed section 14a. In other words, all of the increased thermal resistance section HR1 of the positive electrode terminal 12 is covered by the first sealed section 14a. Similarly, all of the increased thermal resistance section HR1 of the negative electrode terminal 13 is covered by the first sealed section 14a.

In the drawings, semicircular notches 12a, 13a that form the narrow sections are shown, but the notches 12a, 13a can have a C shape, V shape or any other shape. Also note that, while the narrow sections shown are formed by providing notches 12a, 13a at the edges on both sides of the respective terminals 12, 13, they can be formed by providing a notch 12a or 13a at the edge on only one side of the respective terminals 12, 13.

The package 14 is formed by a film explained later in such a way that the shape as viewed from above becomes roughly rectangular. This package 14 has on its three sides (right side, bottom side and top side in FIG. 1) successive first through third first sealed sections 14a to 14c of a specified width. Sealed in this package 14 are the electric storage element 11, one part of the positive electrode terminal 12, one part of the negative electrode terminal 13, and electrolyte 15.

The electrolyte 15 can be sealed by pre-impregnating the electrolyte 15 in the electric storage element 11 before the package 14 is formed, or by forming the package 14 and then filling in the electrolyte 15 through a hole pre-formed in the package 14 and sealing the hole, or by any other method.

Favorable examples of the film used to form the package 14 include, among others: (E11) a laminate film (refer to FIG. 4) having a series of layers including a protective layer L1 made of nylon or other plastic, barrier layer L2 made of aluminum or other metal or $Al_2O_3$ or other metal oxide, insulation layer L3 made of polyethylene terephthalate or other plastic, and seal layer L4 made of polypropylene or other polymer or any precursor, half-hardened form or other variation thereof; (E12) a laminate film identical to the E11 laminate film except that the insulation layer L3 has been removed to make the seal layer L4 sufficiently thick; and (E13) a non-laminate film constituted only by a seal layer L4 having a sufficient thickness.

The seal layer L4 can be sealed by heat, by mechanical pressure bonding, by hardening through irradiation of UV light or other electron beam, by irradiating electromagnetic waves, or by using various other methods. Light, electromagnetic waves, heat, mechanical compression and other sources of energy can be used for sealing. As for the sealing mechanism, hardening, plasticizing and adhesion can be used, among others.

It should be noted that the barrier layer L2 constituted by an E11 or E12 laminate film plays the role of inhibiting leakage of the electrolyte 15 from the package 14, inhibiting intrusion of water into the package 14, and so on. Also, the insulation layer L3 plays the role of inhibiting the barrier layer L2 from contacting the electric storage element 11 even when the seal layer L4 has melted as a result of heat sealing, etc.

On the other hand, one favorable example of how the package 14 can be formed with an E11 or E12 laminate film, E13 non-laminate film, etc., is to (E21) prepare one rectangular film of a specified size, place an electric storage element 11, etc., on the seal layer side of the rectangular film, and then fold/bend the rectangular film at the center and seal the three sides where the seal layers overlap each other by means of heat sealing, etc.

The drawings show successive first through third first sealed sections 14a to 14c on three sides of the package 14, but a package having successive first through fourth sealed sections on four sides can be used in place of the package 14. One favorable example of how this package having successive sealed sections on four sides can be formed with an E11 or E12 laminate film, E13 non-laminate film, etc., is to (E22) prepare two rectangular films of a specified size, place an electric storage element 11, etc., on the seal layer side of a first rectangular film, and then place a second rectangular film over the first rectangular film and seal the four sides where the seal layers overlap each other by means of heat sealing, etc.

When mounting the electric double layer capacitor 10 of the first embodiment onto a substrate, etc., by high-temperature reflow soldering using lead-free solder, the other part of the positive electrode terminal 12 and the other part of the negative electrode terminal 13 are placed in contact with their mating part, respectively, such as land, via solder paste. Next, the substrate, etc., on which the electric double layer capacitor 10 has been placed is introduced into a reflow oven.

Maximum temperatures inside reflow ovens used in reflow soldering using lead-free solder may reach around 250° C., for example. This means that, in the process where the electric double layer capacitor 10 passes through the reflow oven, the other part of the positive electrode terminal 12 and other part of the negative electrode terminal 13, which are locations to be soldered, receive a significant amount of heat corresponding to the temperature in the reflow oven.

However, since increased thermal resistance sections HR1 are provided on the one part of the positive electrode terminal 12 and one part of the negative electrode terminal 13 of the electric double layer capacitor 10, transmission of the heat received by the other part of the positive electrode terminal 12 and other part of the negative electrode terminal 13 to the electric storage element 11 in the package 14 through the terminals 12, 13 can be suppressed by the increased thermal resistance sections HR1.

In other words, even if a significant amount of heat corresponding to the temperature in the reflow oven is received by the other part of the positive electrode terminal 12 and other part of the negative electrode terminal 13 during reflow soldering, transmission of this heat to the electric storage element 11 in the package 14 can be suppressed to avert thermal deterioration of the electric storage element 11, while at the same time any deterioration in electrical characteristics of the electric double layer capacitor 10 due to such thermal deterioration can be inhibited.

To be specific, the increased thermal resistance sections HR1 provided on the one part of the positive electrode terminal 12 and one part of the negative electrode terminal 13 are formed by narrow sections whose thermal conduction area is smaller than other sections, and the increased thermal resistance sections HR1 demonstrate the ability to suppress thermal conduction based on their higher thermal resistance due to the smaller thermal conduction area. On the other hand, the electric storage element 11 has a pre-determined maximum allowable temperature limit, which means that as long as the temperature rise of the electric storage element 11 during reflow soldering is kept at or below this maximum allowable temperature limit, the electric storage element 11 will not undergo thermal deterioration. In other words, thermal deterioration of the electric storage element 11 due to reflow soldering can be averted by setting the thermal conduction area and other specifications of the increased thermal resistance sections HR1 properly to keep the temperature rise of the electric storage element 11 during reflow soldering to or below the maximum allowable temperature limit.

Moreover, the increased thermal resistance sections HR1 formed by narrow sections are positioned entirely within the first sealed section 14a of the package 14, which reduces the amount of heat transferred from the terminals 12, 13 into the package 14. This way, temperature rise of the electric storage element 11 due to heat can be suppressed.

Figure 6:
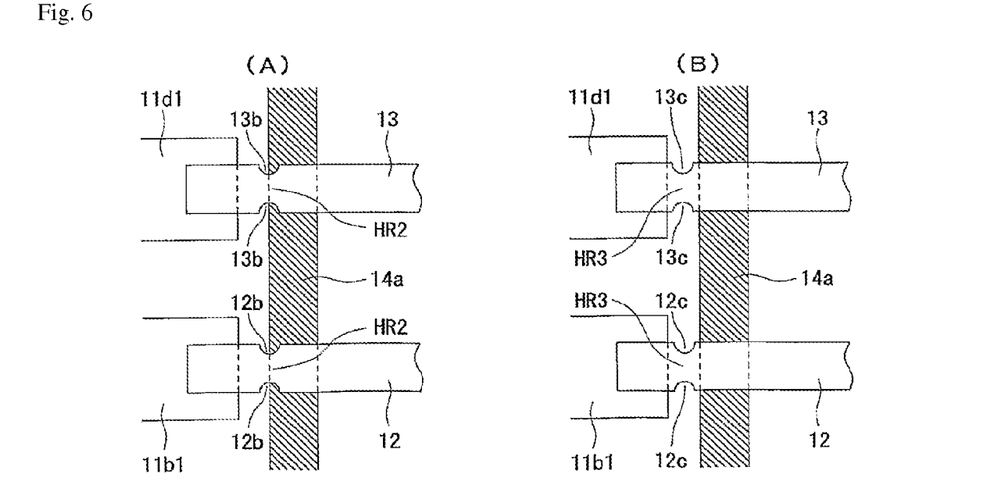
FIG. 6 is a drawing showing a first example of variation and second example of variation of increased thermal resistance sections in the first embodiment.

FIG. 6(A) shows a first example of variation of the increased thermal resistance section in the first embodiment.

Increased thermal resistance sections HR2 shown in this figure are positioned partially within the first sealed section 14a, and the increased thermal resistance sections HR2 are partially covered by the first sealed section 14a. These increased thermal resistance sections HR2 are formed by narrow sections of the same shape as the narrow sections forming the increased thermal resistance sections HR1 in the first embodiment. This narrow section is formed by providing notches 12b, 13b at the edges on both sides of the positive electrode terminal 12 and negative electrode terminal 13 in positions closer to the electric storage element 11 than the notches 12a, 13a in the first embodiment.

According to this first example of variation, the heat capacity of the sealed section 14a can be actively used as a buffer for the heat that would otherwise transfer into the package 14 from the terminals 12, 13, thereby reducing the amount of heat flowing into the package 14. This, together with the effect of thermal resistance, suppresses temperature rise of the electric storage element 11 due to heat.

FIG. 6(B) shows a second example of variation of the increased thermal resistance section in the first embodiment. Increased thermal resistance sections HR3 shown in this figure are positioned entirely away from the first sealed section 14a, and the increased thermal resistance sections HR3 are not covered by the first sealed section 14a. These increased thermal resistance sections HR3 are formed by narrow sections of the same shape as the narrow sections forming the increased thermal resistance sections HR1 in the first embodiment. These narrow sections are formed by providing notches 12c, 13c at the edges on both sides of the positive electrode terminal 12 and negative electrode terminal 13 in positions even closer to the electric storage element 11 than the notches 12b, 13b in the first example of variation.

According to this second example of variation, the amount of heat flowing into the package 14 from the package 14 through the terminals 12, 13 can be reduced when there is a significant temperature rise of not only the terminals 12, 13, but also the package 14. This way, temperature rise of the electric storage element 11 due to heat can be suppressed.

[Second Embodiment]

Figure 7:
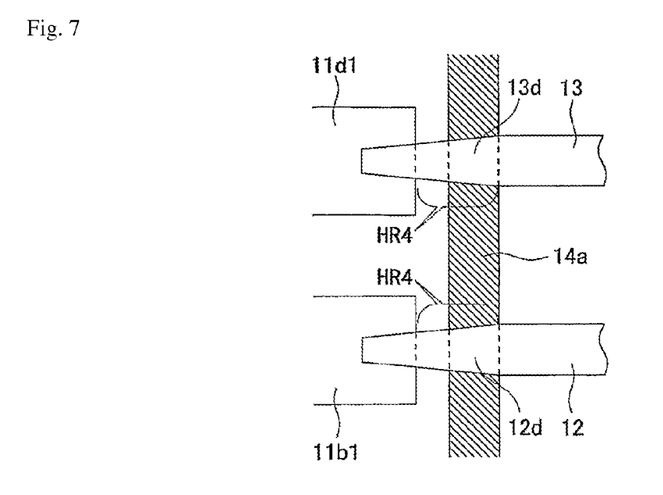
FIG. 7 is an enlarged lateral section view of key parts of an electric double layer capacitor, illustrating a second embodiment where the present invention is applied to an electric double layer capacitor.

FIG. 7 is an enlarged lateral section view of key parts of an electric dual layer capacitor, illustrating a second embodiment where the present invention is applied to an electric dual layer capacity. The parts shown in this FIG. 7 are the same as the key parts shown in FIG. 5.

The difference between the electric dual layer capacitor of the second embodiment and electric dual layer capacitor 10 of the first embodiment is in the form of increased thermal resistance sections HR4 provided on the one part of the positive electrode terminal 12 and one part of the negative electrode terminal 13. The remainder of the constitution is the same as that of the electric dual layer capacitor 10 of the first embodiment, so the same symbols are used and explanations of identical parts are omitted.

To be specific, the increased thermal resistance section HR4 of the positive electrode terminal 12 is formed by a narrow section formed on the one part of the positive electrode terminal 12. This narrow section is formed by providing a trapezoidal section 12d at the end of the positive electrode terminal 12. The trapezoidal section 12d has a tapered shape that narrows toward the electric storage element 11. Similarly, the increased thermal resistance section HR4 of the negative electrode terminal 13 is formed by a narrow section formed on the one part of the negative electrode terminal 13. This narrow section is formed by providing a trapezoidal section 13d at the end of the negative electrode terminal 13. The trapezoidal section 13d has a tapered shape that narrows toward the electric storage element 11.

Since one end of the positive electrode terminal 12 is electrically connected to each connection piece 11b1 of the electric storage element 11, the trapezoidal section 12d, except for the end connected to the connection piece, functions as the increased thermal resistance section HR4. Similarly, one end of the negative electrode terminal 13 is electrically connected to each connection piece 11d1 of the electric storage element 11, and therefore the trapezoidal section 13d, except for the end connected to the connection piece, functions as the increased thermal resistance section HR4.

Also, the increased thermal resistance section HR4 of the positive electrode terminal 12 is positioned partially within the first sealed section 14a, and similarly the increased thermal resistance section HR4 of the negative electrode terminal 13 is positioned partially within the first sealed section 14a. In other words, the increased thermal resistance section HR4 of the positive electrode terminal 12 is partially covered by the first sealed section 14a, and similarly the increased thermal resistance section HR4 of the negative electrode terminal 13 is partially covered by the first sealed section 14a.

The trapezoidal sections 12d, 13d forming the narrow sections, as shown in the drawing, have their edges on both sides inclined, but trapezoidal sections having an inclined edge only on one side are also acceptable.

When mounting the electric double layer capacitor of the second embodiment onto a substrate, etc., by high-temperature reflow soldering using lead-free solder, the other part of the positive electrode terminal 12 and other part of the negative electrode terminal 13 are placed in contact with their mating part, respectively, such as land, via solder paste. Next, the substrate, etc., on which the electric double layer capacitor has been placed is introduced into a reflow oven.

Maximum temperatures inside reflow ovens used in reflow soldering using lead-free solder may reach around 250° C., for example. This means that, in the process where the electric double layer capacitor passes through the reflow oven, the other part of the positive electrode terminal 12 and other part of the negative electrode terminal 13, which are locations to be soldered, receive a significant amount of heat corresponding to the temperature in the reflow oven.

However, since increased thermal resistance sections HR4 are provided on the one part of the positive electrode terminal 12 and one part of the negative electrode terminal 13 of the electric double layer capacitor, transmission of the heat received by the other part of the positive electrode terminal 12 and other part of the negative electrode terminal 13 to the electric storage element 11 in the package 14 through the terminals 12, 13 can be suppressed by the increased thermal resistance sections HR4.

In other words, even if a significant amount of heat corresponding to the temperature in the reflow oven is received by the other part of the positive electrode terminal 12 and other part of the negative electrode terminal 13 during reflow soldering, transmission of this heat to the electric storage element 11 in the package 14 can be suppressed to avert thermal deterioration of the electric storage element 11, while at the same time any deterioration in electrical characteristics of the electric double layer capacitor 10 due to such thermal deterioration can be inhibited.

To be specific, the increased thermal resistance sections HR4 provided on the one part of the positive electrode terminal 12 and one part of the negative electrode terminal 13 are formed by narrow sections whose thermal conduction area is smaller than other sections, and the increased thermal resistance sections HR4 demonstrate the ability to suppress thermal conduction based on their higher thermal resistance due to the smaller thermal conduction area. On the other hand, the electric storage element 11 has a pre-determined maximum allowable temperature limit, which means that as long as the temperature rise of the electric storage element 11 during reflow soldering is kept at or below this maximum allowable temperature limit, the electric storage element 11 will not undergo thermal deterioration. In other words, thermal deterioration of the electric storage element 11 due to reflow soldering can be averted by setting the thermal conduction area and other specifications of the increased thermal resistance sections HR4 properly to keep the temperature rise of the electric storage element 11 during reflow soldering at or below the maximum allowable temperature limit.

Moreover, the increased thermal resistance sections HR4 formed by narrow sections are positioned partially within the first sealed section 14*a* of the package 14, which reduces the amount of heat transferred from the terminals 12, 13 into the package 14. Also, they have long areas that form thermal resistance against the direction of flow of heat in the terminals 12, 13. This results in a gradual temperature slope as well as smaller deformation stress due to temperature strain that normally accompanies any increase in thermal resistance. These factors contribute to the reduction of thermal load applied to the sealed section.

Figure 8:
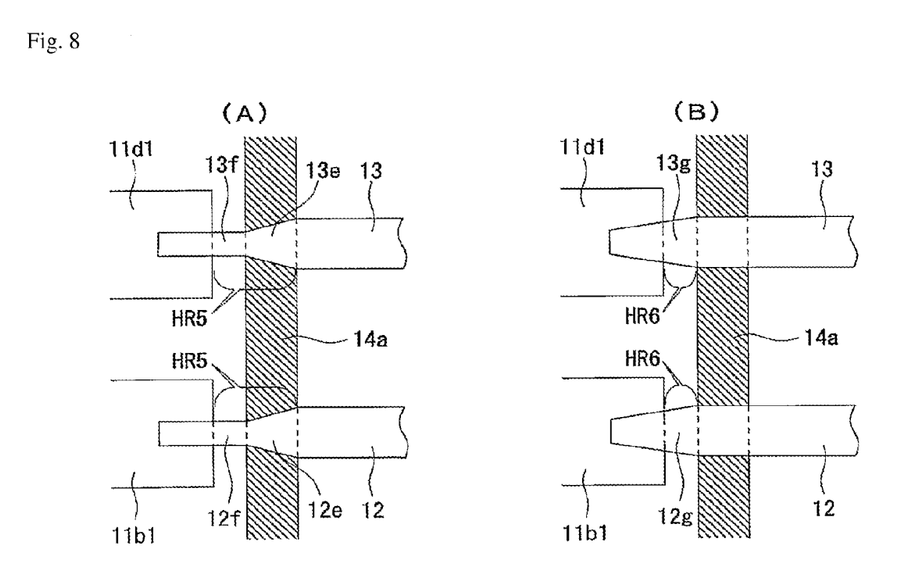
FIG. 8 is a drawing showing a first example of variation and second example of variation of increased thermal resistance sections in the second embodiment.

FIG. 8(A) shows a first example of variation of the increased thermal resistance section in the second embodiment. Increased thermal resistance sections HR5 shown in this figure are positioned partially within the first sealed section 14*a*, and the increased thermal resistance sections HR5 are partially covered by the first sealed section 14*a*. These increased thermal resistance sections HR5 are formed by narrow sections whose shape is different from the increased thermal resistance sections HR4 in the second embodiment. These narrow sections are formed by providing trapezoidal sections 12*d*, 13*d* and band sections 12*f*, 13*f* successively at the end of the positive electrode terminal 12 and end of the negative electrode terminal 13. The trapezoidal sections 12*d*, 13*d* have a tapered shape that narrows toward the electric storage element 11, while the band sections 12*f*, 13*f* have the same width as the narrowest location of the trapezoidal sections 12*d*, 13*d*.

Since one end of the positive electrode terminal 12 is electrically connected to each connection piece 11*b*1 of the electric storage element 11, the trapezoidal section 12*e* and band section 12*f*, except for the end connected to the connection piece, function as the increased thermal resistance section HR5. Similarly, one end of the negative electrode terminal 13 is electrically connected to each connection piece 11*d*1 of the electric storage element 11, and therefore the trapezoidal section 13*e* and band section 13*f*, except for the end connected to the connection piece, function as the increased thermal resistance section HR5.

According to this first example of variation, inflow of heat to the electric storage element 11 can be reduced most. Also, these increased thermal resistance sections have long areas that form thermal resistance against the direction of flow of heat in the terminals 12, 13. This results in a gradual temperature slope as well as smaller deformation stress due to temperature strain that normally accompanies any increase in thermal resistance.

FIG. 8(B) shows a second example of variation of the increased thermal resistance section in the second embodiment. Increased thermal resistance sections HR6 shown in this figure are positioned entirely away from the first sealed section 14*a*, and the increased thermal resistance sections HR6 are not covered by the first sealed section 14*a*. These increased thermal resistance sections HR6 are formed by narrow sections of roughly the same shape as the narrow sections forming the increased thermal resistance sections HR4 in the second embodiment. These narrow sections are formed by providing trapezoidal sections 12*g*, 13*g* at the edges on both sides of the positive electrode terminal 12 and negative electrode terminal 13 in positions closer to the electric storage element 11 than the trapezoidal sections 12*d*, 13*d* in the first embodiment.

Since one end of the positive electrode terminal 12 is electrically connected to each connection piece 11*b*1 of the electric storage element 11, the trapezoidal section 12*g*, except for the end connected to the connection piece, functions as the t increased hermal resistance section HR6. Similarly, one end of the negative electrode terminal 13 is electrically connected to each connection piece 11*d*1 of the electric storage element 11, and therefore the trapezoidal section 13*g*, except for the end connected to the connection piece, functions as the increased thermal resistance section HR6.

According to this second example of variation, the amount of heat flowing into the package 14 from the package 14 through the terminals 12, 13 can be reduced when there is a significant temperature rise of not only the terminals 12, 13, but also the package 14. This way, temperature rise of the electric storage element 11 due to heat can be suppressed.

[Third Embodiment]

Figure 9:
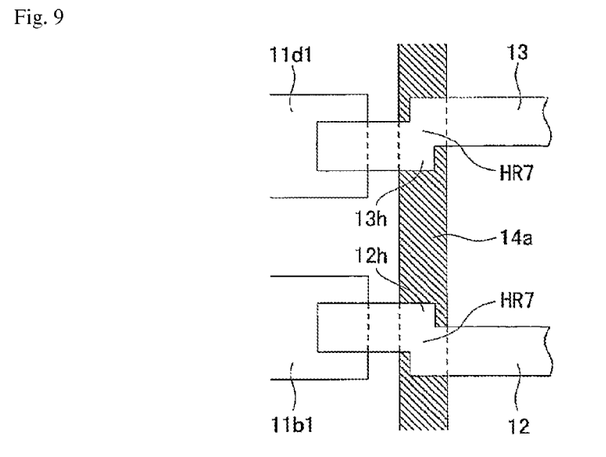
FIG. 9 is an enlarged lateral section view of key parts of an electric double layer capacitor, illustrating a third embodiment where the present invention is applied to an electric double layer capacitor.

FIG. 9 is an enlarged lateral section view of key parts of an electric dual layer capacitor, illustrating a third embodiment where the present invention is applied to an electric dual layer capacity. The parts shown in this FIG. 9 are the same as the key parts shown in FIG. 5.

The difference between the electric dual layer capacitor of the third embodiment and electric dual layer capacitor 10 of the first embodiment is in the form of increased thermal resistance sections HR7 provided on the one part of the positive electrode terminal 12 and one part of the negative electrode terminal 13. The remainder of the constitution is the same as that of the electric dual layer capacitor 10 of the first embodiment, so the same symbols are used and explanations of identical parts are omitted.

In other words, the increased thermal resistance section HR7 of the positive electrode terminal 12 is formed by a bent section formed on the one part of the positive electrode terminal 12, where the bent section is formed by providing, on the positive electrode terminal 12, a section 12*h* that is folded/bent by roughly 90 degrees twice in different directions. Similarly, the increased thermal resistance section HR7 of the negative electrode terminal 13 is formed by a bent section formed on the one part of the negative electrode terminal 13, where the bent section is formed by providing, on the negative electrode terminal 13, a section 13*h* that is folded/bent by roughly 90 degrees twice in different directions.

Also, the increased thermal resistance section HR7 of the positive electrode terminal 12 is positioned entirely within the first sealed section 14*a*, and similarly the increased thermal resistance section HR7 of the negative electrode terminal 13 is positioned entirely within the first sealed section 14*a*. In other words, the increased thermal resistance section HR7 of the positive electrode terminal 12 is entirely covered by the first sealed section 14*a*, and similarly the increased thermal resistance section HR7 of the negative electrode terminal 13 is entirely covered by the first sealed section 14*a*.

The folded/bent sections 12*h*, 13*h* for forming the bent sections, as shown in the figure, are folded/bent by roughly 90 degrees twice in different directions, but other folding/bending angles and/or folding/bending forms can also be adopted.

When mounting the electric double layer capacitor of the third embodiment onto a substrate, etc., by high-temperature reflow soldering using lead-free solder, the other part of the positive electrode terminal 12 and other part of the negative electrode terminal 13 are placed in contact with their mating part, respectively, such as land, via solder paste. Next, the substrate, etc., on which the electric double layer capacitor has been placed is introduced into a reflow oven.

Maximum temperatures inside reflow ovens used in reflow soldering using lead-free solder may reach around 250° C., for example. This means that, in the process where the electric double layer capacitor passes through the reflow oven, the other part of the positive electrode terminal 12 and other part of the negative electrode terminal 13, which are locations to be soldered, receive a significant amount of heat corresponding to the temperature in the reflow oven.

However, since increased thermal resistance sections HR7 are provided on the one part of the positive electrode terminal 12 and one part of the negative electrode terminal 13 of the electric double layer capacitor, transmission of the heat received by the other part of the positive electrode terminal 12 and other part of the negative electrode terminal 13 to the electric storage element 11 in the package 14 through the terminals 12, 13 can be suppressed by the increased thermal resistance sections HR7.

In other words, even if a significant amount of heat corresponding to the temperature in the reflow oven is received by the other part of the positive electrode terminal 12 and other part of the negative electrode terminal 13 during reflow soldering, transmission of this heat to the electric storage element 11 in the package 14 can be suppressed to avert thermal deterioration of the electric storage element 11, while at the same time any deterioration in electrical characteristics of the electric double layer capacitor 10 due to such thermal deterioration can be inhibited.

To be specific, the increased thermal resistance sections HR7 provided on the one part of the positive electrode terminal 12 and one part of the negative electrode terminal 13 are formed by bent sections whose thermal conduction length is locally increased, and the increased thermal resistance sections HR7 demonstrate the ability to suppress thermal conduction based on their higher thermal resistance due to the increased thermal conduction length. On the other hand, the electric storage element 11 has a pre-determined maximum allowable temperature limit, which means that as long as the temperature rise of the electric storage element 11 during reflow soldering is kept at or below this maximum allowable temperature limit, the electric storage element 11 will not undergo thermal deterioration. In other words, thermal deterioration of the electric storage element 11 due to reflow soldering can be averted by setting the thermal conduction length and other specifications of the increased thermal resistance sections HR7 properly to keep the temperature rise of the electric storage element 11 during reflow soldering at or below the maximum allowable temperature limit.

Moreover, the increased thermal resistance sections HR7 formed by bent sections are positioned partially within the first sealed section 14a of the package 14, which places the increased thermal resistance sections at positions closest to the package 14 on its outside and also maximizes the contact areas with the sealed section 14a, and consequently the heat capacity of the sealed section 14a can be utilized most effectively and temperature rise of the electric storage element 11 due to heat can be suppressed as a result.

Figure 10:
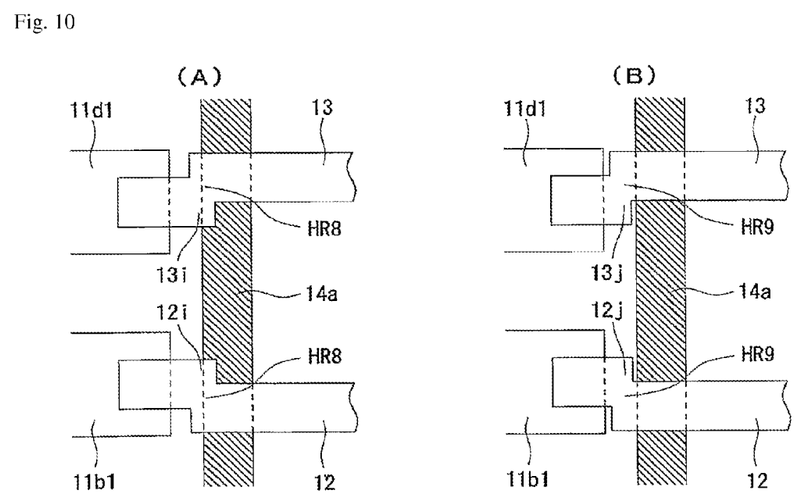
FIG. 10 is a drawing showing a first example of variation and second example of variation of increased thermal resistance sections in the third embodiment.

FIG. 10(A) shows a first example of variation of the increased thermal resistance section in the third embodiment. Increased thermal resistance sections HR8 shown in this figure are positioned partially within the first sealed section 14a, and the increased thermal resistance sections HR8 are partially covered by the first sealed section 14a. These increased thermal resistance sections HR8 are formed by bent sections of the same shape as the bent sections forming the increased thermal resistance sections HR7 in the third embodiment. These bent sections are formed by providing sections 12i, 13i that are folded/bent by roughly 90 degrees twice in different directions, on both the positive electrode terminal 12 and negative electrode terminal 13, at positions closer to the electric storage element 11 than the folded/bent sections 12h, 13h in the third embodiment.

According to this first example of variation, not only the thermal resistance increases, but also the internal pressure of the package 14 increases due to temperature rise, resulting in an increased internal volume of the package 14 and consequent inhibition of in-plane movement of the electric storage element 11.

FIG. 10(B) shows a second example of variation of the increased thermal resistance section in the third embodiment. Increased thermal resistance sections HR9 shown in this figure are positioned entirely away from the first sealed section 14a, and the increased thermal resistance sections HR9 are not covered by the first sealed section 14a. These increased thermal resistance sections HR9 are formed by bent sections of roughly the same shape as the bent sections forming the increased thermal resistance sections HR7 in the third embodiment. These narrow sections are formed by providing sections 12j, 13j that are folded/bent by roughly 90 degrees twice in different directions, on both the positive electrode terminal 12 and negative electrode terminal 13, at positions even closer to the electric storage element 11 than the folded/bent sections 12i, 13i in the first example of variation.

According to this second example of variation, not only the thermal resistance increases, but also the internal pressure of the package 14 increases due to temperature rise, resulting in an increased internal volume of the package 14 and consequent flexibility of the electric storage element 11 to move in plane and receive force. Because of this, the sealed section does not receive any force and opening of gaps can be inhibited.

[Fourth Embodiment]

Figure 11:
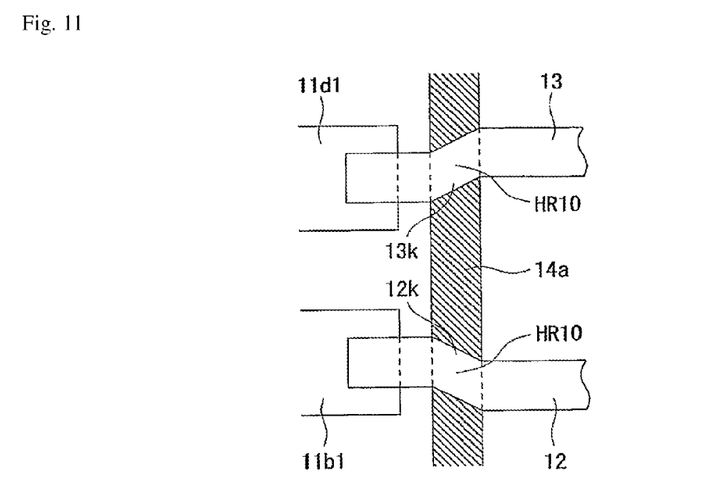
FIG. 11 is an enlarged lateral section view of key parts of an electric double layer capacitor, illustrating a fourth embodiment where the present invention is applied to an electric double layer capacitor.

FIG. 11 is an enlarged lateral section view of key parts of an electric dual layer capacitor, illustrating a fourth embodiment where the present invention is applied to an electric dual layer capacity. The parts shown in this FIG. 11 are the same as the key parts shown in FIG. 5.

The difference between the electric dual layer capacitor of the fourth embodiment and electric dual layer capacitor 10 of the first embodiment is in the form of increased thermal resistance sections HR10 provided on the one part of the positive electrode terminal 12 and one part of the negative electrode terminal 13. The remainder of the constitution is the same as that of the electric dual layer capacitor 10 of the first embodiment, so the same symbols are used and explanations of identical parts are omitted.

In other words, the increased thermal resistance section HR10 of the positive electrode terminal 12 is formed by a skewed section formed on the one part of the positive electrode terminal 12, and the skewed section is formed by providing a section 12k inclined by approx. 30 degrees on the positive electrode terminal 12. Similarly, the increased thermal resistance section HR10 of the negative electrode terminal 13 is formed by a skewed section formed on the one part of the negative electrode terminal 13, and the skewed section is formed by providing a section 13k inclined by approx. 30 degrees on the negative electrode terminal 13.

Also, the increased thermal resistance section HR10 of the positive electrode terminal 12 is positioned entirely within the first sealed section 14a, and similarly the increased thermal resistance section HR10 of the negative electrode terminal 13 is positioned entirely within the first sealed section 14a. In other words, the increased thermal resistance section HR10 of the positive electrode terminal 12 is entirely covered by the first sealed section 14a, and similarly the increased thermal resistance section HR10 of the negative electrode terminal 13 is entirely covered by the first sealed section 14a.

The inclined sections 12k, 13k for forming the skewed sections, as shown in the figure, are inclined by approx. 30 degrees, but other inclination angles can also be adopted as long as it is an acute angle.

When mounting the electric double layer capacitor of the fourth embodiment onto a substrate, etc., by high-temperature reflow soldering using lead-free solder, the other part of the positive electrode terminal 12 and other part of the negative electrode terminal 13 are placed in contact with their mating part, respectively, such as land, via solder paste. Next, the substrate, etc., on which the electric double layer capacitor has been placed is introduced into a reflow oven.

Maximum temperatures inside reflow ovens used in reflow soldering using lead-free solder may reach around 250° C., for example. This means that, in the process where the electric double layer capacitor passes through the reflow oven, the other part of the positive electrode terminal 12 and other part of the negative electrode terminal 13, which are locations to be soldered, receive a significant amount of heat corresponding to the temperature in the reflow oven.

However, since increased thermal resistance sections HR10 are provided on the one part of the positive electrode terminal 12 and one part of the negative electrode terminal 13 of the electric double layer capacitor, transmission of the heat received by the other part of the positive electrode terminal 12 and other part of the negative electrode terminal 13 to the electric storage element 11 in the package 14 through the terminals 12, 13 can be suppressed by the increased thermal resistance sections HR10.

In other words, even if a significant amount of heat corresponding to the temperature in the reflow oven is received by the other part of the positive electrode terminal 12 and other part of the negative electrode terminal 13 during reflow soldering, transmission of this heat to the electric storage element 11 in the package 14 can be suppressed to avert thermal deterioration of the electric storage element 11, while at the same time any deterioration in electrical characteristics of the electric double layer capacitor 10 due to such thermal deterioration can be inhibited.

To be specific, the increased thermal resistance sections HR10 provided on the one part of the positive electrode terminal 12 and one part of the negative electrode terminal 13 are formed by skewed sections whose thermal conduction length is locally increased, and the increased thermal resistance sections HR10 demonstrate the ability to suppress thermal conduction based on their higher thermal resistance due to the increased thermal conduction length. On the other hand, the electric storage element 11 has a pre-determined maximum allowable temperature limit, which means that as long as the temperature rise of the electric storage element 11 during reflow soldering is kept at or below this maximum allowable temperature limit, the electric storage element 11 will not undergo thermal deterioration. In other words, thermal deterioration of the electric storage element 11 due to reflow soldering can be averted by setting the thermal conduction length and other specifications of the increased thermal resistance sections HR10 properly to keep the temperature rise of the electric storage element 11 during reflow soldering at or below the maximum allowable temperature limit.

Moreover, the increased thermal resistance sections HR10 formed by skewed sections are positioned partially within the first sealed section 14a of the package 14, which ensures desired thermal resistance and inhibits heat from flowing into the package 14, while at the same time the thermal load applied to the sealed section can be dispersed because of the longer distance between the terminals 12, 13.

Figure 12:
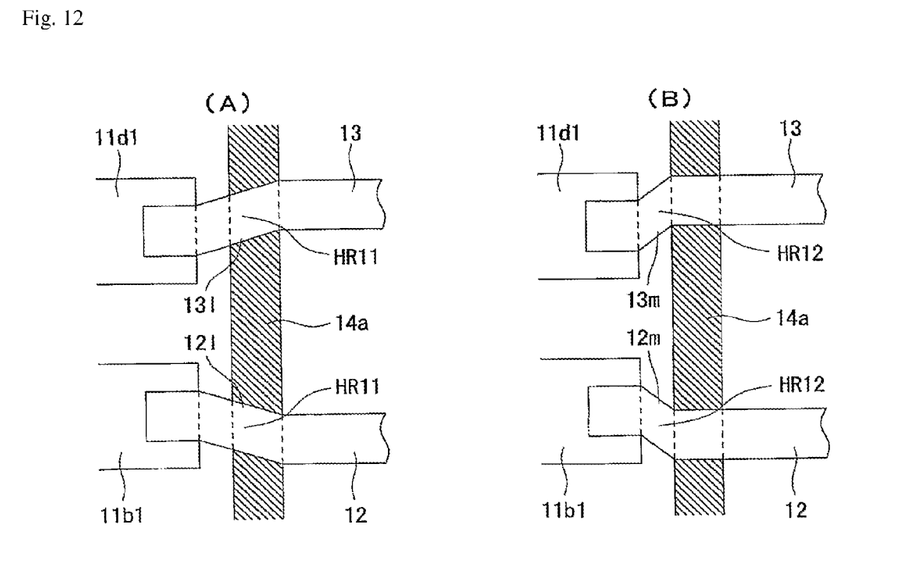
FIG. 12 is a drawing showing a first example of variation and second example of variation of increased thermal resistance sections in the fourth embodiment.
Figure 13:
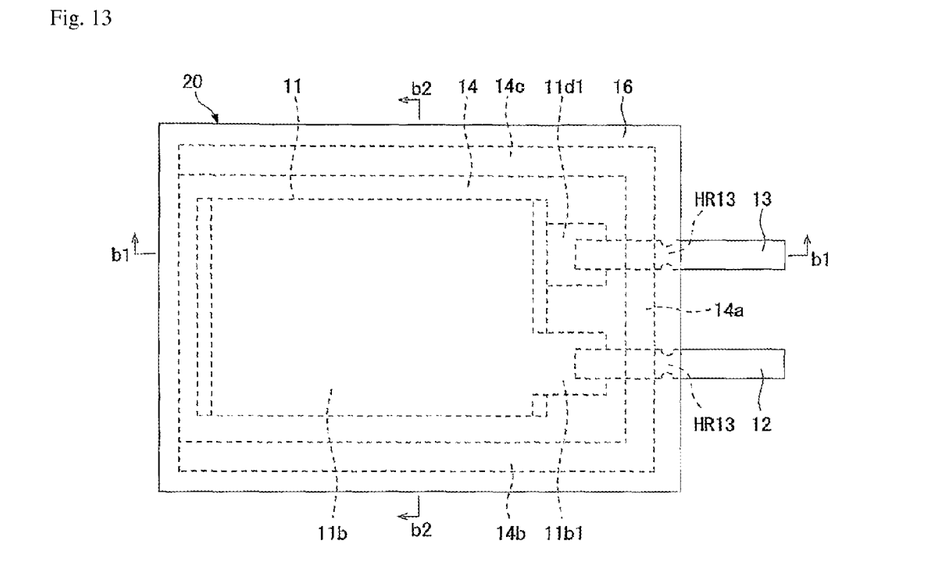
FIG. 13 is a top view of an electric double layer capacitor, illustrating a fifth embodiment where the present invention is applied to an electric double layer capacitor.
Figure 14:
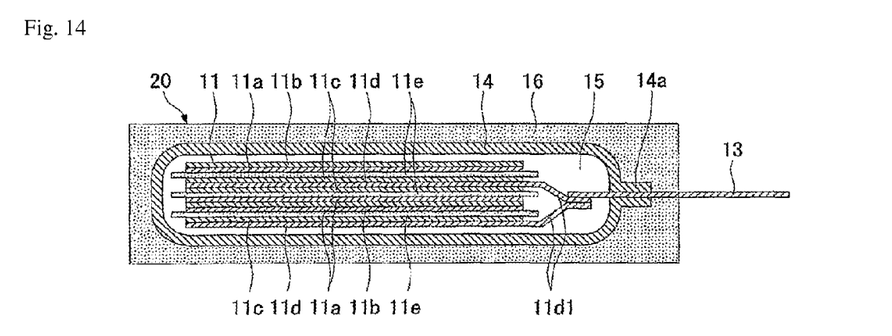
FIG. 14 is a longitudinal section view taken along a line b1-b1 in FIG. 13.
Figure 15:
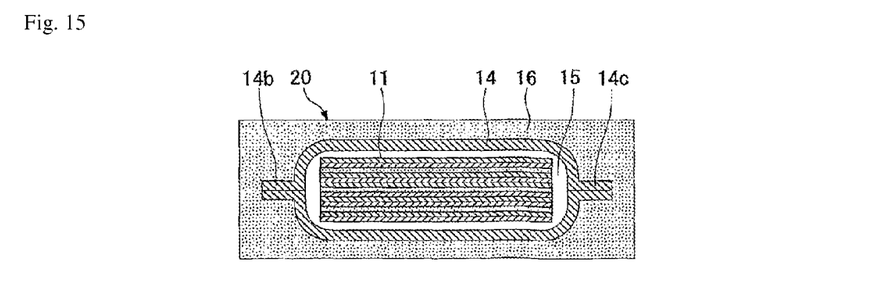
FIG. 15 is a longitudinal section view taken along a line b2-b2 in FIG. 13.

FIG. 12(A) shows a first example of variation of the increased thermal resistance section in the fourth embodiment. Increased thermal resistance sections HR11 shown in this figure are positioned partially within the first sealed section 14a, and the increased thermal resistance sections HR11 are partially covered by the first sealed section 14a. These increased thermal resistance sections HR11 are formed by skewed sections of roughly the same shape as the skewed sections forming the increased thermal resistance sections HR10 in the fourth embodiment. These skewed sections are formed by providing inclined sections 12l, 13l, on both the positive electrode terminal 12 and negative electrode terminal 13, at positions closer to the electric storage element 11 than the inclined sections 12k, 13k in the fourth embodiment.

According to this first example of variation, stress concentration due to thermal expansion can be reduced because of less folding/bending of the terminals 12, 13 compared to what is shown in FIG. 11.

FIG. 12(B) shows a second example of variation of the increased thermal resistance section in the fourth embodiment. Increased thermal resistance sections HR12 shown in this figure are positioned entirely away from the first sealed section 14a, and the increased thermal resistance sections HR12 are not covered by the first sealed section 14a. These increased thermal resistance sections HR12 are formed by skewed sections of roughly the same shape as the skewed sections forming the increased thermal resistance sections HR10 in the fourth embodiment. These skewed sections are formed by providing inclined sections 12m, 13m, on both the positive electrode terminal 12 and negative electrode terminal 13, at positions even closer to the electric storage element 11 than the inclined sections 12l, 13l in the first example of variation.

According to this second example of variation, the thermal load of the sealed section 14a can be minimized due partly to the longer distance between the terminals 12, 13, and due partly to the small contact areas of the terminals 12, 13 and sealed section 14a.

[Fifth Embodiment]

FIGS. 13 to 16 show a fifth embodiment where the present invention is applied to an electric dual layer capacitor. FIGS. 13, 14, 15 and 16 illustrate, in the context of the fifth embodiment, the same parts shown in FIGS. 1, 2, 3 and 5 of the aforementioned first embodiment, respectively.

The difference between an electric dual layer capacitor 20 of the fifth embodiment and the electric dual layer capacitor 10 of the first embodiment is that in the former, a molded exterior cladding 16 is provided further on the outside of the package 14. The remainder of the constitution is the same as that of the electric dual layer capacitor 10 of the first embodiment, so the same symbols are used and explanations of identical parts are omitted.

In other words, the electric dual layer capacitor 20 of the fifth embodiment has an electric storage element 11, one pair of terminals (positive electrode terminal 12 and negative electrode terminal 13), package 14, electrolyte 15, and molded exterior cladding 16 covering the package 14. In addition, increased thermal resistance sections HR13 are provided on the one part of the positive electrode terminal 12 and one part of the negative electrode terminal 13 in the same manner as in the first embodiment. These increased thermal resistance sections HR13 are formed by narrow sections that are respectively formed on the one part of the positive electrode terminal 12 and one part of the negative electrode terminal 13. These narrow sections are formed by providing notches 12n, 13n at the edges on both sides of the positive electrode terminal 12 and negative electrode terminal 13. Also in the electric dual layer capacitor 20 of this embodiment, these narrow sections are positioned entirely within the molded exterior cladding 16. In other words, all of the increased thermal resistance section HR13 of the positive electrode terminal 12 is covered by the molded exterior cladding 16. Similarly, all of the increased thermal resistance section HR13 of the negative electrode terminal 13 is covered by the molded exterior cladding 16.

The molded exterior cladding 16 is made of epoxy or other plastic, cement of alumina or other ceramic, or the like, in such a way that the shape as viewed from above becomes roughly rectangular. This molded exterior cladding 16 has the package 14 sealed therein. And, sealed in this package 14 are the electric storage element 11, one part of the positive electrode terminal 12, one part of the negative electrode terminal 13, and electrolyte 15, as with the first embodiment.

Figure 16:
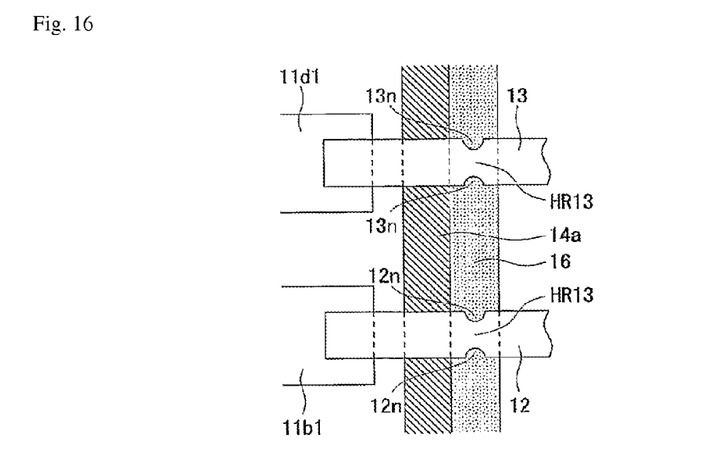
FIG. 16 is an enlarged lateral section view of key parts in FIG. 13.

Since the increased thermal resistance sections HR13 are provided on the one part of the positive electrode terminal 12 and one part of the negative electrode terminal 13 of the electric dual layer capacitor 20, transmission of the heat received by the other part of the positive electrode terminal 12 and other part of the negative electrode terminal 13 to the package 14 in the molded exterior cladding 16 as well as to the electric storage element 11 in the package 14, through the terminals 12, 13, can be suppressed by the increased thermal resistance sections HR13.

Figure 17:
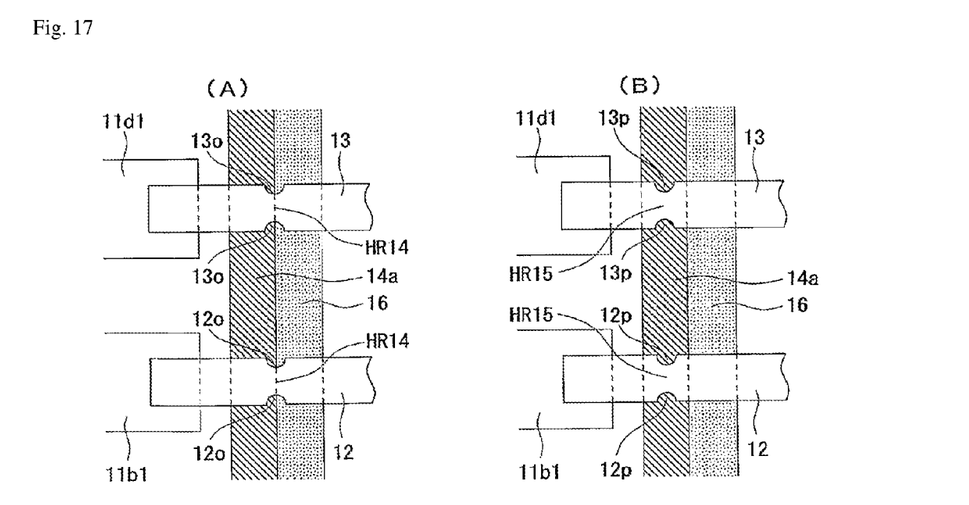
FIG. 17 is a drawing showing a first example of variation and second example of variation of increased thermal resistance sections in the fifth embodiment.

FIG. 17(A) shows a first example of variation of the increased thermal resistance section in the fifth embodiment. Increased thermal resistance sections HR14 shown in this figure are positioned partially within the molded exterior cladding 16, and the remainders of the increased thermal resistance sections HR14 are covered by the first sealed section 14a of the package 14. These increased thermal resistance sections HR14 are formed by narrow sections of the same shape as the narrow sections forming the increased thermal resistance sections HR13 in the fifth embodiment. These narrow sections are formed by providing notches 12o, 13o at the edges on both sides of the positive electrode terminal 12 and negative electrode terminal 13 at positions closer to the electric storage element 11 than the notches 12n, 13n in the fifth embodiment.

According to this first example of variation, the terminals 12, 13 will break if significant deformation stress generates due to the difference between the coefficients of thermal expansion of the molded exterior cladding 16 and package 14, thereby mitigating the impact of such stress on the electric storage element 11.

FIG. 17(B) shows a second example of variation of the increased thermal resistance section in the fifth embodiment. Increased thermal resistance sections HR15 shown in this figure are positioned entirely away from the molded exterior cladding 16, and the increased thermal resistance sections HR15 are covered by the first sealed section 14a of the package 14. These increased thermal resistance sections HR15 are formed by narrow sections of the same shape as the narrow sections forming the increased thermal resistance sections HR13 in the fifth embodiment. These narrow sections are formed by providing notches 12p, 12p at the edges on both sides of the positive electrode terminal 12 and negative electrode terminal 13 at positions even closer to the electric storage element 11 than the notches 12o, 13o in the first example of variation.

According to this second example of variation, the contact areas between the molded exterior cladding 16 and terminals 12, 13 become larger, which allows for more effective suppression of temperature rise of the electric storage element 11 in the package 14 by making use of the heat capacity of the molded exterior cladding 16.

[Other Embodiments]

(1) In the first through fifth embodiments, the present invention was applied to an electric double layer capacitor. However, the present invention can also be applied to other electrochemical devices having the structure of at least one pair of terminals leading out of a package in which an electric storage element is sealed, such as lithium ion capacitors, redox capacitors and lithium ion batteries, to achieve similar effects.

DESCRIPTION OF THE SYMBOLS

10 Electric dual layer capacitor
11 electric storage element
12 Positive electrode terminal
13 Negative electrode terminal
HR1 to HR15 Increased thermal resistance section
14 Package
14a to 14c Sealed section

What is claimed is:

1. An electrochemical device adapted to be mounted by soldering, comprising: an electric storage element; a package having the electric storage element sealed therein; and at least one pair of terminals where parts of the terminals are led out from the electric storage element and sealed inside the package together with the electric storage element, and other parts are led out to the outside of the package and exposed; wherein increased thermal resistance sections are provided on the parts of the terminals for inhibiting heat generated by soldering from transferring to the electric storage element, through the terminals, from the other parts of the terminals, wherein each increased thermal resistance section is disposed in a portion inward from the exposed part of each terminal, and the increased thermal resistance section is constituted by a section thinner than a section of the terminal at a boundary of the exposed and non-exposed parts of the terminal, a bent section relative to a direction in which the terminal is led out from the boundary to the outside of the package, or a skewed section relative to the direction, wherein the package has a sealed section, the other parts of the terminals are led out to the outside of the package through the sealed section, and the increased thermal resistance sections are positioned entirely away from the sealed section.

2. An electrochemical device according to claim 1, wherein the increased thermal resistance sections are formed by narrow sections.

3. An electrochemical device according to claim 1, wherein the increased thermal resistance sections are formed by bent sections.

4. An electrochemical device according to claim 1, wherein the increased thermal resistance sections are formed by skewed sections.

5. An electrochemical device according to claim 1, wherein a distance between portions of the terminals led out to the outside of the package is greater than a distance between portions of the terminals led out from the electric storage element.

6. An electrochemical device according to claim 1, which is an electric double layer capacitor.

* * * * *